United States Patent Office 3,539,370
Patented Nov. 10, 1970

3,539,370
ASPHALT ANTIHARDENING AGENTS
Armin C. Pitchford, Bartlesville, Okla., assignor to Phillips Petroleum Company, a corporation of Delaware
No Drawing. Filed Oct. 12, 1967, Ser. No. 674,734
Int. Cl. C08h 13/00, 17/22
U.S. Cl. 106—278    7 Claims

ABSTRACT OF THE DISCLOSURE

Asphalt hardening is retarded by the addition of (a) blends of calcium petroleum sulfonates and hydrocarbon oils; (b) metal dialkyldithiocarbamates, metal dialkylthioformamides, or tetraalkyldithiooxamides; or (c) combinations of (a) with either one or more (b) components or a fatty acid.

BACKGROUND OF THE INVENTION

The hardening of asphalt during processing prior to or during application, and subsequent to application as paving or sealing material and in compositions such as asphaltic concrete is a well-known problem which has been the subject of extensive investigation. This problem is generally more pronounced in more severe applications such as hot-mixing asphalt and aggregate for paving use. Results of numerous studies have indicated that all varieties of asphalts undergo severe cracking and raveling after prolonged service exposure. This deterioration is attributed to a combination of factors which result in hardening and diminished ductility or flexibility of the asphalt.

The nature and influence of the several factors which combine to destroy the favorable qualities of asphalts in these applications have been investigated at conditions which accelerate the deterioration experienced during processing and service. As a result, of these investigations, I have found that several of the factors influencing degradation of asphalt are increase in oxygen content and, in some instances, minor increases in average molecular weight which might be expected to result from free radical initiated cross-linking, i.e., chemical combination of low molecular weight constituents.

I have found that these detrimental effects can be substantially deterred by a novel combination of inhibitors which, when combined with asphalt, result in a product having considerably increased tolerance to hardening under both simulated service and severe processing conditions.

It is therefore one object of this invention to provide a novel asphalt composition. It is yet another of this invention to provide novel asphalt hardening deterrents compatible with asphalts. It is another object of this invention to provide improved asphalt compositions having increased tolerance to hardening. It is yet another object of this invention to provide novel synergistic asphalt hardening deterrent compositions. It is yet another object of this invention to provide combinations of materials which exhibit synergistic increases in asphalt hardening inhibition when employed in combination.

SUMMARY OF THE INVENTION

In accordance with one embodiment of this invention asphaltic compositions are rendered more resistant to hardening by the addition of (a) mixtures of calcium petroleum sulfonates and hydrocarbon oils or (b) metal dialkyldithiocarbamates, metal dialkylthioformamides, or tetraalkyldithiooxamides, or (c) combinations of (a) with either one or more (b) components or a fatty acid. Substantial improvements result from the addition of these deterrent compositions to asphaltic base stocks. In addition, as will be illustrated by the examples, the combinations of calcium petroleum sulfonates and hydrocarbon oils are synergisitc and provide a substantial improvement in asphalt hardening resistance whereas each component employed independently does not even approach the effectiveness of comparable concentrations of the combinations. Furthermore, combinations of (a), as above defined, with a metal dialkyldithiocarbamate, a metal dialkyldithiocarbamide, a tetraalkyldithiooxamide, or a fatty acid are also synergistic in that they achieve a degree of asphalt hardening resistance substantially in excess of that which would be anticipated on the basis of their individual effectiveness.

Any calcium petroleum sulfonate can be employed as such or overbased in combination with a wide range of hydrocarbon oils. It is preferred, however, that the calcium petroleum sulfonates be the calcium salts of the sulfonic acids of aliphatic, aromatic, cycloaliphatic hydrocarbons and combinations thereof having from about 10 to about 100 carbon atoms. It is also presently preferred that the hydrocarbon oil be one or more of the hydrocarbons above described as base stocks for the calcium petroleum sulfonates, preferably a highly refined, high molecular weight petroleum fraction as described in U.S. Pat. No. 3,135,693. A presently preferred method for the production of the calcium sulfonates as well as mixtures thereof with the preferred hydrocarbons is disclosed in the aforementioned patent. Briefly, that process involves the sulfonation of a partially refined petroleum bright stock fraction in the presence of sulfur dioxide and sulfur trioxide to produce the corresponding sulfonic acids followed by the neutralization of those acids with calcium hydroxide. The blend of calcium petroleum sulfonates and unreacted hydrocarbons which results from this partial sulfonation and neutralization can be employed, as is, in the compositions of this invention.

The ratio of calcium sulfonates to the hydrocarbon oil can vary considerably but is usually within the range of from about 25:75 to about 75:25. The presently preferred weight ratios of sulfonate to hydrocarbon oil are within the range of from about 0.5:1 to about 2:1. The total base number of the calcium petroleum sulfonates can also vary considerably. These sulfonates can be used as such or they can be overbased. In most applications, however, it is preferred that the total base number of these sulfonates be within the range of from about 1 to about 20 meq. KOH/gm.

The total base number (TBN) is determined by a modified ASTM D654–58 procedure. In this modified test, 2 grams of the calcium petroleum sulfonate are dissolved in 100 ml. of a 50/50 mixture of benzene and isopropyl alcohol containing 0.5 volume percent water. The mixture is shaken well and the pH is determined using a standard pH meter. If the pH is above 4, the mixture is then titrated to a pH of 4 using standard 0.1 N HCl. From this titration, the total base number is calculated as follows:

$$TBN = \frac{(V)(N)(56.1)}{W}$$

where V=ml. of HCl, N=normality of HCl, and W=weight of sample, in grams. The total base number is reported as mg. of KOH per gram of oil.

I have found that a wide variety of fatty acids are effective in the synergistic combinations referred to. For example, acids having from about 10 to about 26 carbon atoms are very effective. Examples of acids that can be used are capric, lauric, palmitic, stearic, behenic, cerotic, and the like. Mixtures of these acids can also be employed.

The metal dithiocarbamates that can be used are those having the formula:

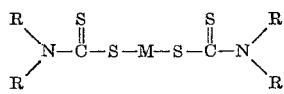

The metal dialkylthioformamides that can be used are those having the formula:

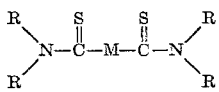

M is preferably zinc, but can be any divalent metal. Examples of other metals that can be used are calcium, barium, nickel, cobalt, cadmium, tin, and the like. The tetraalkyldithiooxamides that can be used are those having the formula:

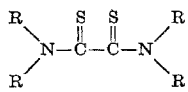

In all these formulas, the R's are alkyl groups usually having from 1 to 10 carbon atoms, such as methyl, ethyl, isobutyl, hexyl, isooctyl, nonyl, decyl, and the like. Inasmuch as the size of the alkyl group is associated primarily with the physical characteristics of these additives, such as dispersability rather than with their effectiveness as hardening deterrents, it is within the scope of the invention to use compounds having higher molecular weight alkyl groups.

The total additive concentration in the asphalt is usually in the range of 0.5 to 3 weight percent of the asphalt, but concentrations outside this range are operable and can be used.

It was found that each of these agents, i.e., the blends of petroleum sulfonates and hydrocarbon oils, the fatty acids, the dialkyldithiocarbamates, the dialkylthioformamides, and the teatraalkyldithiooxamides were effective antihardening agents. It was also determined that combinations of these materials were more efficient inhibitors than could have been predicted on the basis of the weight average effectiveness of each component alone. It was determined therefore that the combinations of these inhibitors are synergistic and possess effectiveness as asphalt antihardening agents in excess of that predicted from the result obtained by the use of each inhibitor independently. I have found therefore that even a very small amount of one of these agents when used in combinations with a major amount of another inhibitor, e.g., in synergistic proportions, results in a blend having increased effectiveness as an asphalt antihardening agent. However, in most applications the combinations of (a) calcium petroleum sulfonate and hydrocarbon oils with (b) metal dialkyldithiocarbamates, metal dialkyldithioformamides and/or tetraalkyldithiooxamides will generally comprise from about 25 to about 75 weight percent of the second component (b) based on the weight of the total blend. Similarly the use of about 25 to about 75 weight percent fatty acid in combination with the calcium petroleum sulfonate-hydrocarbon oil mixture has been found convenient in most applications. Compositions which have been found to be most desirable are those containing from about 40 to about 60 weight percent fatty acid based on the combined weight of acids and calcium petroleum sulfonate-hydrocarbon oil mixture.

Additive-containing blends were evaluated by a modification of ASTM procedure D1754–60T for determining the effect of heat and air on asphaltic materials. By this procedure a ⅛-inch film of asphalt is normally heated for 5 hours in a revolving shelf convection oven at 325° F. However, the test period was shortened to 2 hours in order to note early changes in the asphalt. The penetration of the asphalt additive blends was compared with that of the base asphalt after the test, which simulates the high-temperature air exposure in the pug mill of a hot mix plant. The additive blends of this invention are effective with all asphalts and blends thereof. Asphalts having softening points (ASTM D36–62T) within the range of from about 90 to about 200° F. are satisfactory for most applications. The asphalt employed in the following examples was derived from a mixture of Rocky Mountain Crudes having a penetration of 90 (77° F./100 g./5 sec.) as determined by ASTM D5–61 at 77° F., using a 100-gram weight for 5 seconds and reported in 10ths of millimeters. The calcium petroleum sulfonate bright stock mixtures employed in this example were produced by the method described in U.S. Pat. 3,135,693 without solvent extraction in that unreacted hydrocarbon was not removed and accounted for about 50 weight percent of the mixture.

To simulate the high-temperature air exposure in the pug mill of a hot mix plant, a 50-gram sample of asphalt, with or without additives, was poured into a 6-inch diameter flat pan, and heated in air for 2 hours at 325° F. Penetration was measured after this high-temperature treatment by ASTM D5–61 at 77° F. using a 100 gram weight for 5 seconds and is reported as percentage of original penetration.

EXAMPLE I

| Additive: | Retained penetration percent of original |
|---|---|
| None | 85.7 |
| Ca petroleum sulfonate, 1 weight percent | 76.7 |
| Bright stock, 1 weight percent | 81.4 |
| Ca petroleum sulfonate, 0.5 weight percent and bright stock, 0.5 weight percent | 91.3 |

EXAMPLE II

| Additive: | Retained penetration percent of original |
|---|---|
| None | 79.0 |
| 1% 50/50 blend Ca pet sulfonate/bright stock | 89.1 |
| 0.75% 50/50 blend Ca pet sulfonate/bright plus 0.25% zinc dimethyldithiocarbamate | 91.5 |
| 0.5% 50/50 blend Ca pet sulfonate/bright stock plus 0.5% zinc dimethyldithiocarbamate | 93.0 |
| 0.25% 50/50 blend Ca pet sulfonate/bright stock plus 0.75% zinc dimethyldithiocarbamate | 90.8 |
| 1% zinc dimethyldithiocarbamate | 88.9 |

EXAMPLE III

| Additive: | Retained penetration percent of original |
|---|---|
| None | 79.0 |
| 1% 50/50 blend Ca pet sulfonate/bright stock | 89.1 |
| 0.75% 50/50 blend Ca pet sulfonate/bright stock plus 0.25% stearic acid | 89.8 |
| 0.5% 50/50 blend Ca pet sulfonate/bright stock plus 0.5% stearic acid | 93.0 |
| 0.25% 50/50 blend Ca pet sulfonate/bright stock plus 0.75% stearic acid | 88.6 |
| 1% stearic acid | 82.5 |

I claim:

1. An asphalt composition having increased resistance to hardening which consists essentially of the asphalt and an inhibiting amount in the range of 0.5 to 3 weight percent of the asphalt, of at least one hardening deterrent combination selected from (a) a blend of calcium petroleum sulfonate and hydrocarbon oil having a ratio of said sulfonate to said oil within the range of from about 1:3 to 3:1; (b) combinations of (a) and metal dithiocarbamates having the formula:

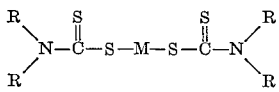

metal dialkylthio formamides having the formula:

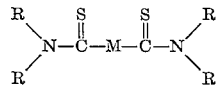

and tetraalkyldithiooxamides having the formula:

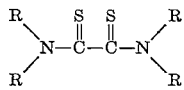

wherein each R is selected from alkyl radicals having from 1 to about 10 carbon atoms and wherein M is a divalent metal said combinations having a ratio of said metal dithiocarbamates, metal dialkylthioformamides, and tetraalkyldithiooxamides to said blend of calcium petroleum sulfonate hydrocarbon oil within the range of from 1:3 to 3:1; and (c) combinations of (a) and a fatty acid having a ratio of said fatty acid to said blend of calcium petroleum sulfonate and hydrocarbon oil within the range of from about 1:3 to 3:1.

2. The composition of claim 1 wherein said metal is selected from the group consisting of zinc, calcium, barium, nickel, cobalt, cadmium and tin.

3. The composition of claim 1 wherein the metal is zinc.

4. The composition of claim 1 wherein the hydrocarbon oil is a hydrocarbon bright stock fraction and wherein said calcium petroleum sulfonate is the calcium salt of hydrocarbon bright stock sulfonic acids.

5. The composition of claim 1 wherein the concentration of said deterrent is within the range of from 0.5 to about 3 weight percent based on said asphalt.

6. The composition of claim 1 wherein the hydrocarbon radical of said calcium petroleum sulfonate is selected from aliphatic, aromatic, cycloaliphatic, and combinations thereof having from about 10 to about 100 carbon atoms, the sulfonate base has a total base number of from about 1 to about 30 meq. KOH/g. and wherein said hydrocarbon oil is selected from aliphatic, aromatic, cycloaliphatic and a combination thereof having from about 10 to about 100 carbon atoms.

7. The composition of claim 1 wherein said calcium petroleum sulfonate is a calcium salt of a sulfonated hydrocarbon bright stock fraction having a total base number within the range from about 1 to about 20 meq. KOH/g., said hydrocarbon oil is a hydrocarbon bright stock fraction, and wherein the asphalt has a softening point within the range of from about 90 to about 200° F.

References Cited

UNITED STATES PATENTS

| 2,669,525 | 2/1954 | Bransky et al. | 106—278 |
| 2,675,328 | 4/1954 | Wishlinski et al. | 106—278 |
| 3,133,823 | 5/1964 | Hardman | 106—280 |
| 3,293,050 | 12/1966 | Lawrence | 106—278 |

JULIUS FROME, Primary Examiner

J. B. EVANS, Assistant Examiner

U.S. Cl. X.R.

94—20, 23; 106—279, 281